(12) United States Patent
Abar

(10) Patent No.: US 8,684,190 B2
(45) Date of Patent: Apr. 1, 2014

(54) MULTI-POSITION SOLAR PANEL RACK

(76) Inventor: Warren Abar, Ottawa (CA)

( * ) Notice: Subject to any disclaimer, the term of this patent is extended or adjusted under 35 U.S.C. 154(b) by 199 days.

(21) Appl. No.: 12/950,465

(22) Filed: Nov. 19, 2010

(65) Prior Publication Data

US 2012/0125869 A1  May 24, 2012

(51) Int. Cl.
*F24J 2/00*  (2006.01)
(52) U.S. Cl.
USPC .......................... 211/41.1; 126/600; 248/150
(58) Field of Classification Search
USPC .......... 211/85, 126.1, 130.1, 132.1, 149, 150, 211/170, 171, 195, 198, 200, 201, 202, 211/41.1; 108/1, 3, 4, 6, 7, 8, 9, 10; 126/600–608, 573, 576, 577; 248/150, 248/166, 454, 455, 456, 457; 312/231; 52/64, 173.3; 136/244, 246, 251
See application file for complete search history.

(56) References Cited

U.S. PATENT DOCUMENTS

| | | | | |
|---|---|---|---|---|
| 538,145 | A * | 4/1895 | Allen | 108/1 |
| 617,090 | A * | 1/1899 | Freese | 211/130.1 |
| 677,216 | A * | 6/1901 | Huebner | 108/4 |
| 697,639 | A * | 4/1902 | Lidner | 108/5 |
| 733,100 | A * | 7/1903 | Werner | 248/456 |
| 836,551 | A * | 11/1906 | Werner | 108/9 |
| 903,821 | A * | 11/1908 | Karges | 108/31 |
| 929,989 | A * | 8/1909 | Sharp | 108/10 |
| 1,044,196 | A * | 11/1912 | Lang | 108/9 |
| 1,057,958 | A * | 4/1913 | Hallock | 108/4 |
| 1,106,418 | A * | 8/1914 | Sprunger | 108/30 |
| 1,335,857 | A * | 4/1920 | Robbins | 108/9 |
| 1,560,422 | A * | 11/1925 | Hendrix | 297/362 |
| 1,975,857 | A * | 10/1934 | McKenney | 108/9 |
| 1,990,032 | A * | 2/1935 | Johanson | 108/119 |
| 2,041,772 | A * | 5/1936 | Lundquist | 108/10 |
| 2,596,986 | A * | 5/1952 | Curtis | 280/641 |
| 2,795,891 | A * | 6/1957 | Bishop | 108/9 |
| 3,094,948 | A * | 6/1963 | Clow | 108/10 |
| 3,141,260 | A * | 7/1964 | Dompieri | 248/455 |
| 3,495,552 | A * | 2/1970 | Dietrick | 108/8 |
| 3,745,935 | A * | 7/1973 | Douglas | 108/1 |
| 3,805,710 | A * | 4/1974 | Leshem | 108/6 |
| 3,827,376 | A * | 8/1974 | Solomon | 108/91 |
| 4,108,154 | A * | 8/1978 | Nelson | 126/576 |
| 4,714,224 | A * | 12/1987 | Calmes | 248/465 |
| 4,765,309 | A * | 8/1988 | Legge | 126/601 |
| 4,880,194 | A * | 11/1989 | Geise et al. | 248/166 |
| 4,921,302 | A * | 5/1990 | Godwin | 297/170 |
| 5,125,608 | A * | 6/1992 | McMaster et al. | 248/163.1 |
| 5,199,360 | A * | 4/1993 | Koistinen | 108/3 |
| 5,730,068 | A * | 3/1998 | Rioux, Jr. | 108/99 |
| RE36,638 | E * | 4/2000 | Herman | 211/149 |
| 6,105,797 | A * | 8/2000 | Haisma | 211/130.1 |
| 6,302,032 | B1 * | 10/2001 | Ranspach | 108/12 |
| 6,321,663 | B1 * | 11/2001 | Rogers | 108/100 |
| 6,431,319 | B1 * | 8/2002 | Myers et al. | 187/243 |
| 6,941,876 | B1 * | 9/2005 | Traino | 108/6 |
| 8,101,849 | B2 * | 1/2012 | Almy et al. | 136/246 |
| 2006/0042624 | A1 * | 3/2006 | Zhang | 126/577 |
| 2009/0152224 | A1 * | 6/2009 | Hsieh | 211/170 |

(Continued)

*Primary Examiner* — Joshua Rodden
(74) *Attorney, Agent, or Firm* — Faegre Baker Daniels LLP

(57) ABSTRACT

The present racking system uses space frame technology to minimize materials while maximizing strength. The rack has multi-position racking capability, using a simple swing arm and pin system to move the solar array into an optimum position for the appropriate time of the year.

10 Claims, 7 Drawing Sheets

(56) References Cited

U.S. PATENT DOCUMENTS

| | | | |
|---|---|---|---|
| 2009/0223315 A1* | 9/2009 | Needham | 74/471 R |
| 2010/0065039 A1* | 3/2010 | Chang et al. | 126/573 |
| 2010/0071684 A1* | 3/2010 | Cowan et al. | 126/605 |
| 2010/0180883 A1* | 7/2010 | Oosting | 126/574 |
| 2010/0223865 A1* | 9/2010 | Gonzalez Moreno | 52/173.3 |
| 2011/0017198 A1* | 1/2011 | Ebrahimi et al. | 126/602 |
| 2012/0006317 A1* | 1/2012 | Sade | 126/600 |
| 2012/0017526 A1* | 1/2012 | Eide | 52/173.3 |

* cited by examiner

MULTI-POSITION SOLAR PANEL RACK

FIELD OF THE INVENTION

This invention relates to a rack for mounting an array of solar panels. Specifically, a multi-position rack using a swing arm and pins.

BACKGROUND OF THE INVENTION

Solar energy is the collection of the sun's energy by systems which convert the power to electricity and/or thermal power. The efficiency of the system determines how much of the sun's energy is collected and utilized.

The positioning of the collector relative to the sun is an important area of research to optimize the power harvested by the system. The more perpendicular the collector is to the sun, the more energy is collected.

When the collector is perpendicular to the sun, the inbound radiant energy density per unit area is maximized. Maintaining a collector perpendicular to the sun as it arcs across the sky at a slightly different elevation every day is expensive because of the need for a system to track the sun. This typically includes sensors, motors and pivots.

The cost to implement a tracking system to keep the collector more perpendicular to the sun can be expensive when compared to the amount of additional energy harvested. The cost to build and maintain the system when compared to the value of the additional useful energy derived from the system determines the return on investment.

Different methodologies not using sensors and motors can also be incorporated to optimize the return on investment. For example, the use of manual tracking where the collector is moved on occasion to capture more of the sun's energy.

The majority of solar collectors are either mounted on racks that can be adjusted based on a single pivot point, or are on motorized trackers that follow the sun.

One of the main limitations of most swivel based systems is that they are a challenge to operate quickly given the weight of the system. Manually adjusted systems with a single pivot point have a single point of failure.

Therefore, there still remains a need for a system that is able to optimize the collection of the sun's energy, while reducing the cost, by collecting the additional energy using a multi-position racking system that is easy to operate.

SUMMARY OF THE INVENTION

The present racking system uses space frame technology to minimize materials while maximizing strength. The rack has multi-position racking capability, using a simple swing arm and pin system to move the solar array into an optimum position for the appropriate time of the year.

The present invention is defined by a multi-position racking system for mounting an array of solar panels, comprising a plurality of legs, a plurality of braces for supporting the legs, an array support, including a back bone pivotally supported by the legs, and a plurality of ribs secured to the back bone, and a swing arm mechanism pivotally connected between the array support and the legs, wherein the swing arm mechanism rotates the array support between multiple positions.

In a preferred embodiment of the racking system, the multiple positions include a first position and a second position.

In a more preferred embodiment of the racking system, the swing arm mechanism includes a lower swing arm portion pivotally connected to the legs, and an upper swing arm portion pivotally connected to the array support.

In a preferred embodiment, the lower swing arm portion includes at least one swing arm handle, preferably, the at least one swing arm handle includes a short swing arm handle and a long swing arm handle.

In a preferred embodiment, locking means secures the array support in each of the multiple positions.

In a preferred embodiment, the plurality of legs include front legs and rear legs, preferably, the front legs are shorter than the rear legs.

In a preferred embodiment, the angle between the array support and the legs in the first position is greater than the angle between the array support and the legs in the second position.

In one embodiment the swing arm mechanism includes at least one swing arm handle which acts as a lever to move the array support between the multiple positions.

Additional characteristics, advantages and functions of the invention will become evident hereinafter from detailed descriptions of examples, in themselves not binding and/or restrictive, of preferential practical embodiments of a multi-position racking system for mounting an array of solar panels, in accordance with this invention, illustrated by the following drawings.

DESCRIPTION OF PREFERRED EMBODIMENT

Figure 1:
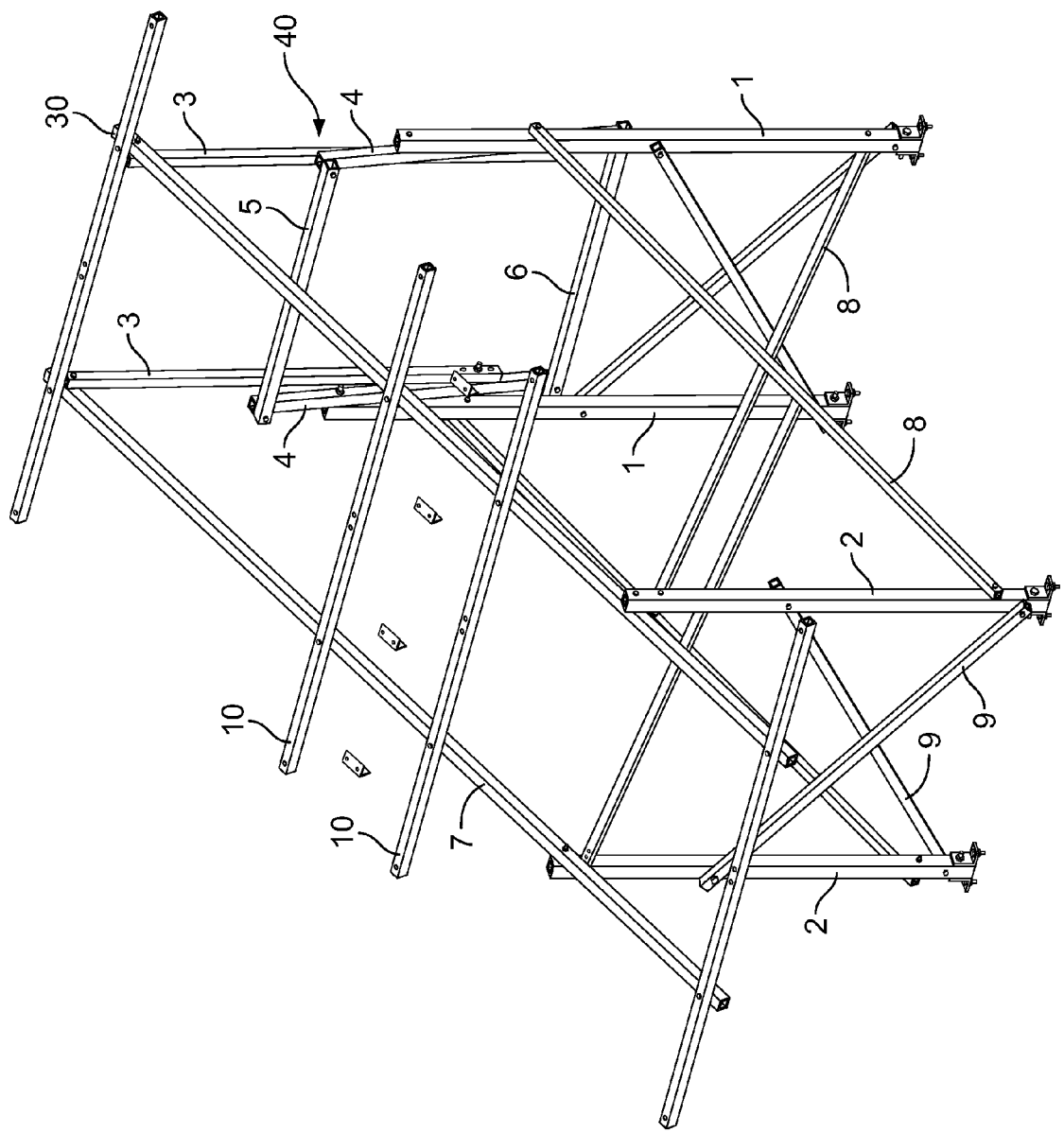
FIG. 1 is a perspective view of the preferred embodiment of the invention.
Figure 2:
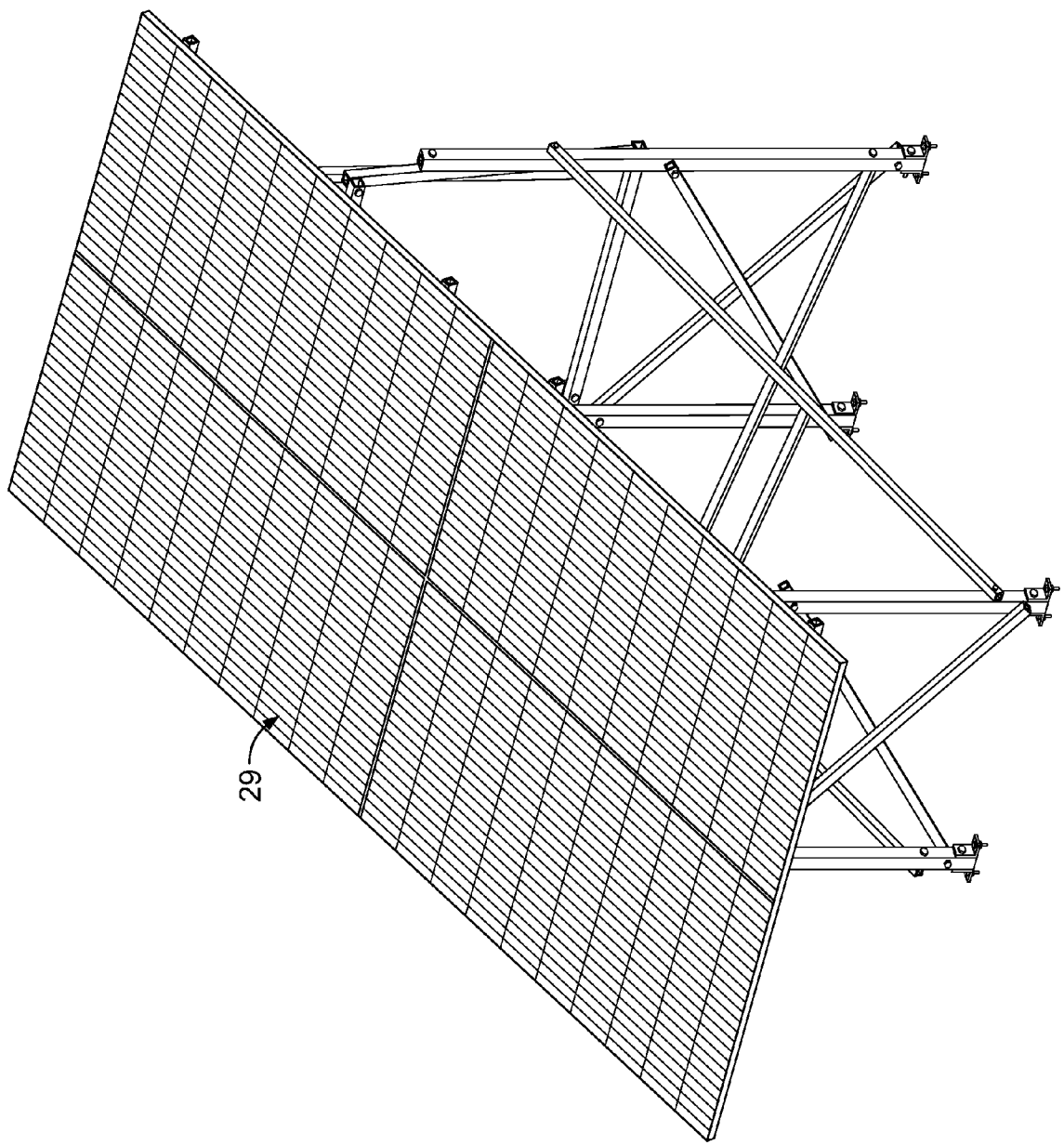
FIG. 2 shows the embodiment in FIG. 1, with the solar array mounted.
Figure 3:
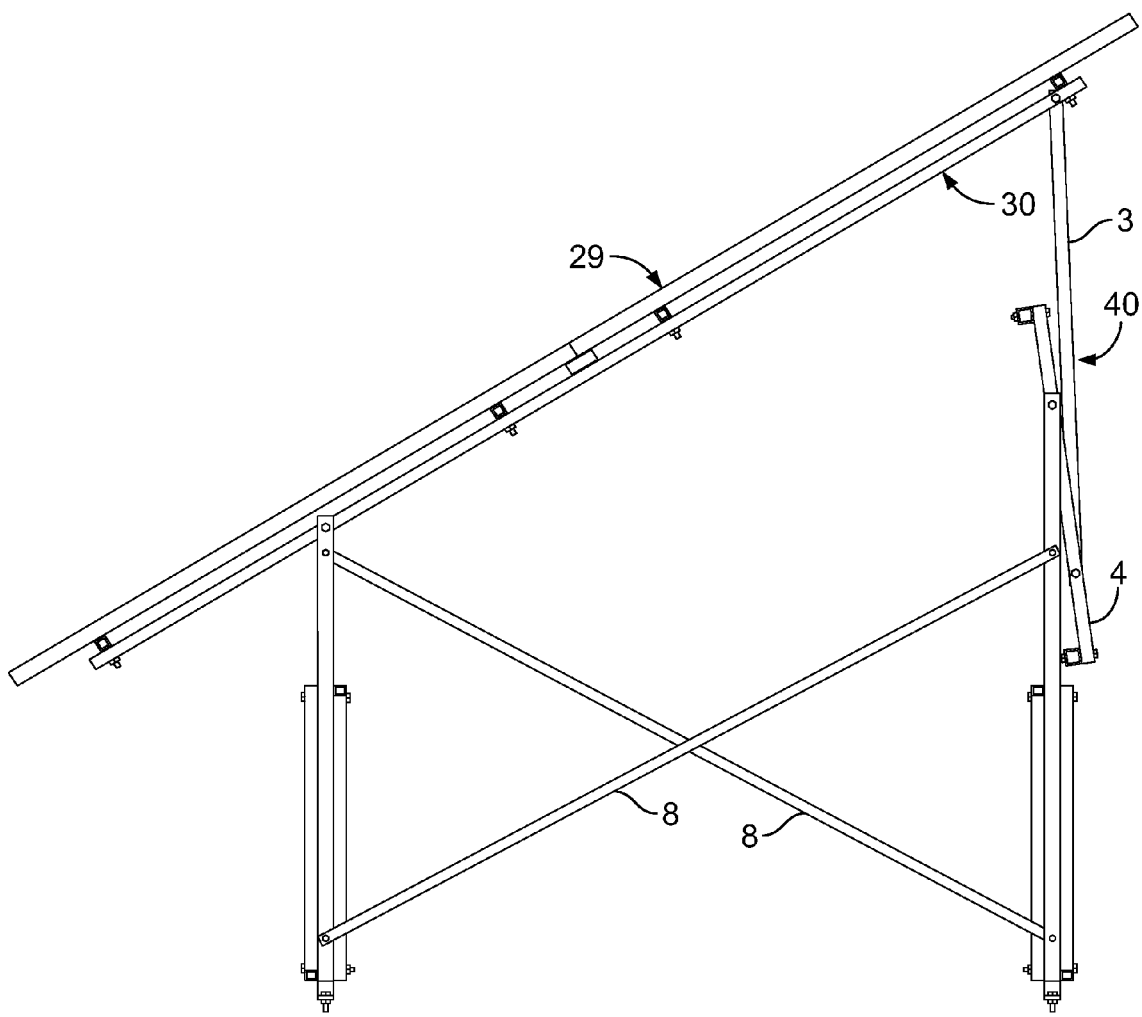
FIG. 3 is a side view of the embodiment of FIG. 2.
Figure 4:
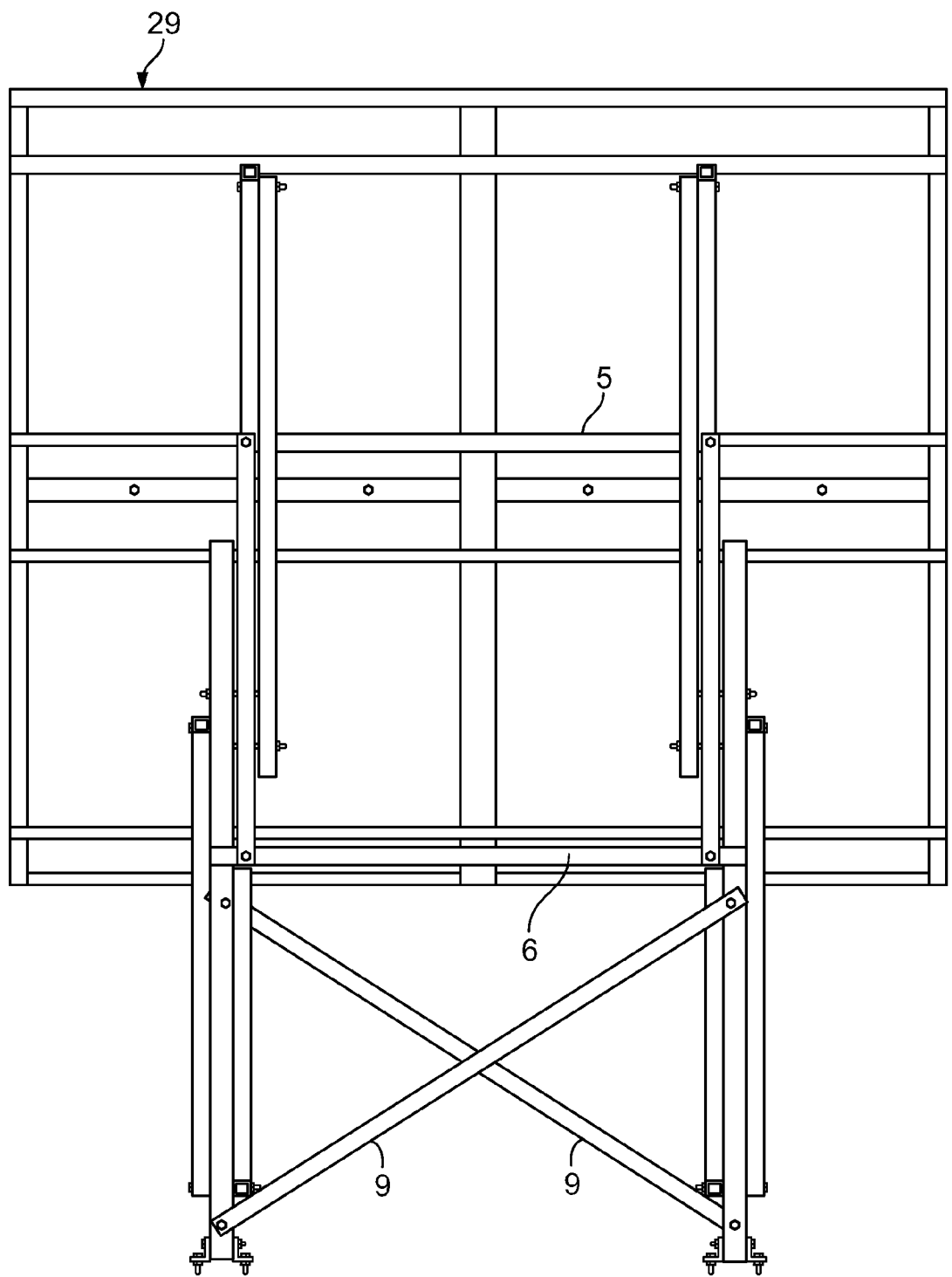
FIG. 4 is a rear view of the embodiment of FIG. 2.

The present racking system uses space frame technology to minimize materials while maximizing strength. The rack has multi-position racking capability, using a simple swing arm and pin system to move the solar array into an optimum position for the appropriate time of the year.

In accordance with the invention, as best seen in the Figures, the preferred embodiment of the invention includes two back legs 1, two front legs 2, with cross braces 8,9 to support the legs 1, 2. Connected to the upper end of each front leg 2 is back bone 7, and secured along the length of the back bone 7 is a plurality of ribs 10. In this embodiment, the back bone 7 comprises two aluminum bars, while there are four aluminum ribs which are aligned perpendicular to the back bone 7. The back bone 7 and the plurality of ribs make up an array support 30, upon which a typical solar panel array 29 is mounted.

Located between the upper end of the back legs 1 and the back bone 7 is swing arm mechanism 40, which includes an upper swing arm 3 and a lower swing arm 4. The lower swing arm 4 has at least one swing arm handle. In the present embodiment, as seen in the Figures, the lower swing arm 4 has a short swing arm handle 5 and a long swing arm handle 6 connected to it. Also seen in the Figures, it is the lower swing arm 4 that is connected to the upper end of the back legs 1.

The connection points between the upper end of the front legs 2 and the back bone 7, the upper end of the back legs 1 and the lower swing arm 4, the lower swing arm 4 and the upper swing arm 3, and the upper swing arm 3 and the back bone 7 are all pivot points. This allows for the swing arm mechanism to rotate the array support 30 from a first position (seen in FIG. 5) and a second position (FIG. 6). In this embodiment, this is easily done by a user, by grasping the long swing arm handle 6, and rotating it upwards. This motion causes the upper swing arm 3 to raise the upper end of the back bone 7, up to the point where the short swing arm handle 6 rests against the sides of the upper swing arm 3. This second position is best shown in FIG. 6.

In use, typically the back legs 1 and the front legs 2 are bolted to brackets (not shown) which run perpendicular to the legs along a section of ground. Usually, the brackets are, in turn, bolted to concrete anchors (not shown) which are secured in the ground. The present invention could also be adapted to be fixed to a roof (angled or flat), or other surface.

Figure 7:
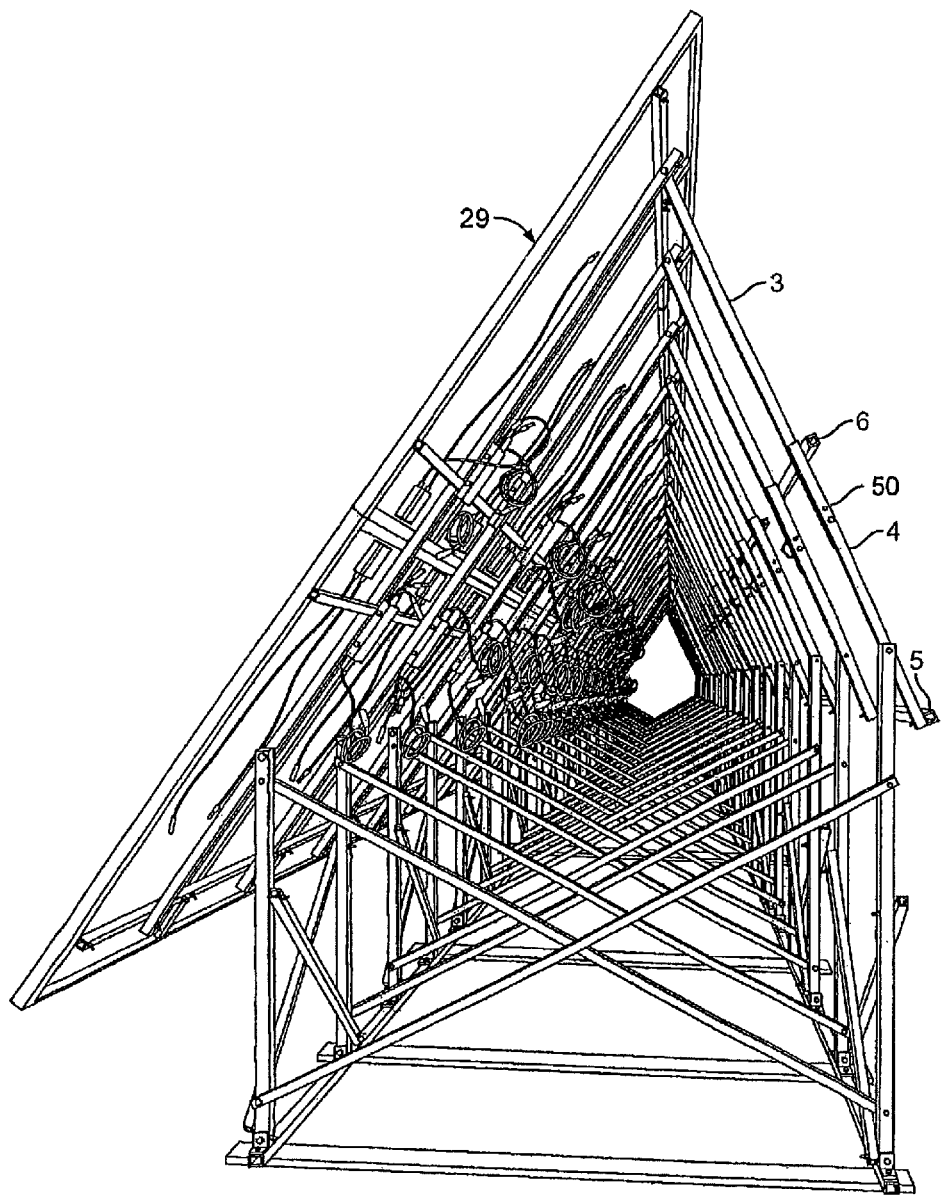
FIG. 7 shows a side view of the embodiment in the second position.

As can be seen in FIG. 7, in this current embodiment, with the array being positioned on the flat ground, the distance between the back legs 1 and the front legs 2 is approximately 72". In the first position, the height of the lower end of the solar array 29 off the ground is approximately 44", and the angle of the array 29 to the horizontal is approximately 30°. In the second position, the height of the lower end of the solar array 29 from the ground is approximately 32", and the angle of the array 29 to the horizontal is approximately 56°. The sun is higher in the sky in the summer (first position) and lower in the winter (second position), so the panels need to have a lower slope in the summer and steeper slope in the winter to get the panel more perpendicular to the sun. The degrees used in this embodiment are relative for the latitude of Ottawa, Ontario, Canada (45 degrees), based on the amount of sunny versus cloudy days for this area. Different configurations providing different angles would be required to get the ideal angle at other latitudes dependent on sunny versus cloudy days.

Also, if the array were to be positioned on an angled surface, such as a roof, it would be clear that the angles would be different. It should also be understood that these dimensions are merely a preferred embodiment, and other dimensions could easily be adapted without departing from the scope of the present invention.

Figure 5:
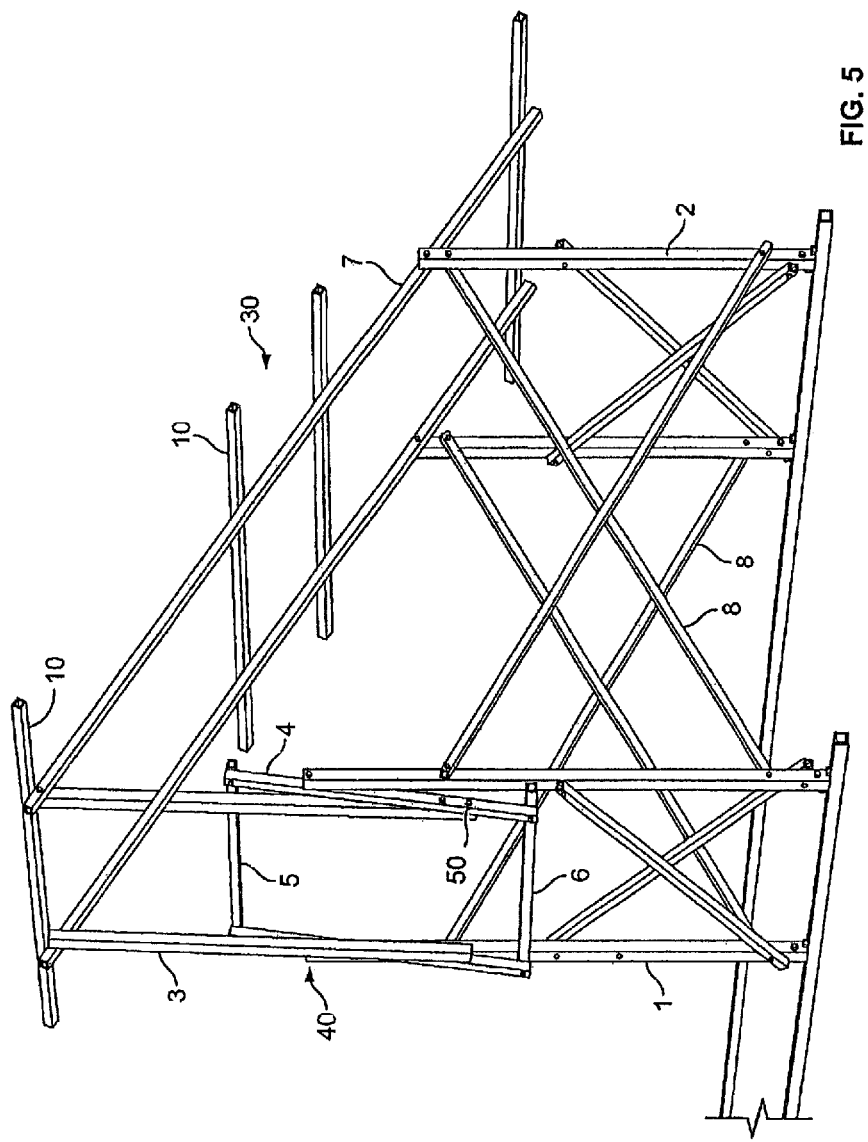
FIG. 5 shows the embodiment of FIG. 1 in a first position.
Figure 6:
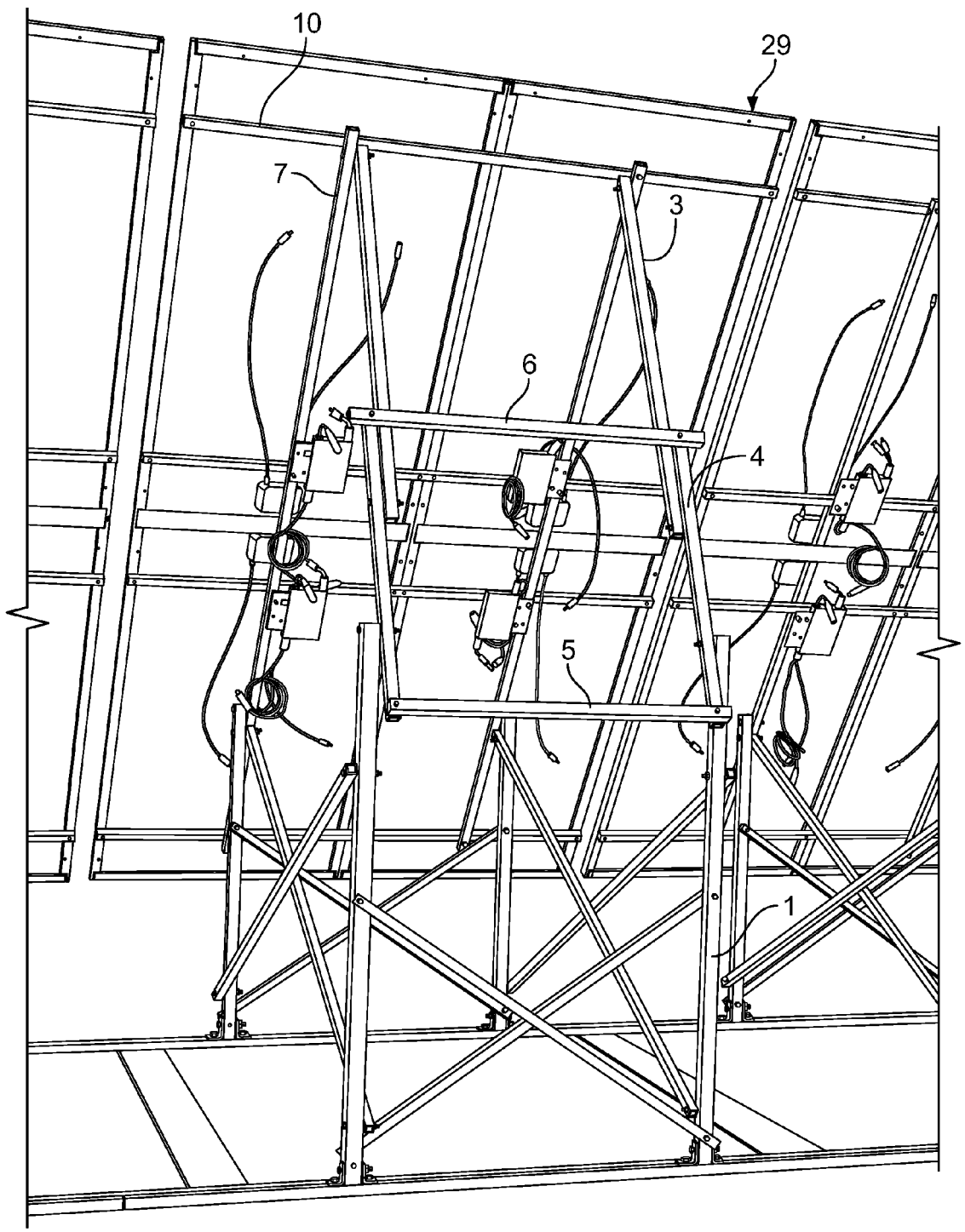
FIG. 6 shows the embodiment of FIG. 1 in a second position.

As shown in FIGS. 5 and 7, holes 50 are drilled through two adjacent pieces, and hitch pins are used to lock the swing arm mechanism into position. Other differing types of mechanisms can be used to lock the swing arm mechanism.

Typically, the connection points are bolts and washers, however, other connections could also be used.

Although the present embodiment shows a design having two front legs and two back legs, a person skilled in the art would appreciate that any type of design which allows for the swing arm mechanism to include at least one swing arm handle which acts as a lever to move the array support between the multiple positions with less force, due to the length of the arms and pivot locations would be included in the present invention.

Other additional obvious modifications may result from embodiments of a multi-position racking system for mounting an array of solar panels.

Space frame technology is used in the present design. As a person skilled in the art would understand, "space frame" or "space structure" is a truss-like, lightweight rigid structure constructed from interlocking struts in a geometric pattern. Space frames usually utilize a multidirectional span, and are often used to accomplish long spans with few supports. They derive their strength from the inherent rigidity of the triangular frame; flexing loads (bending moments) are transmitted as tension and compression loads along the length of each strut.

In each case, any constructive component exemplified, described and illustrated, necessary for the purposes, can be replaced with other technically equivalent means and/or components.

Similarly, in the tests and in practical embodiments, according to the proposed embodiments and applications, the materials used, and the forms and dimensions are the most suitable and chosen according to the specified requirements.

The invention claimed is:

1. A multi-position racking system for mounting an array of solar panels, comprising:
    a plurality of legs, including at least two front legs and at least two back legs;
    a plurality of braces for supporting the legs;
    a solar panel array support, including a back bone pivotally supported by the front legs, and a plurality of ribs secured to the back bone; and
    a swing arm mechanism pivotally connected between the solar panel array support and the back legs, the swing arm mechanism further including a lower swing arm portion which is pivotally connected to an upper swing arm portion;
    wherein the lower swing arm portion includes at least one swing arm handle, which acts as a lever to rotate the solar panel array support between multiple positions; and
    wherein the solar panel array support is capable of supporting the array of solar panels in each of the multiple positions, wherein the multiple positions include a first position and a second position; and
    wherein the at least one swing arm handle includes a short swing arm handle and a long swing arm handle, and the long swing arm handle abuts the back legs in the first position, and the long swing arm handle abuts the upper swing arm portion in the second position.

2. A multi-position racking system, comprising:
    a solar panel array;
    a plurality of legs, including at least two front legs and at least two back legs;
    a plurality of braces for supporting the legs;
    a solar panel array support, including a back bone pivotally supported by the front legs, and a plurality of ribs secured to the back bone; and
    a swing arm mechanism pivotally connected between the solar panel array support and the back legs, the swing arm mechanism further including a lower swing arm portion which is pivotally connected to an upper swing arm portion;
    wherein the lower swing arm portion includes at least one swing arm handle;
    wherein the swing arm mechanism rotates the solar panel array support between multiple positions; and
    wherein the solar panel array support is capable of supporting the solar panel array in each of the multiple positions.

3. The racking system of claim 2, wherein the multiple positions include a first position and a second position.

4. The racking system of claim 3, wherein the angle between the solar panel array support and a horizontal plane in the first position is smaller than the angle between the solar panel array support and the horizontal plane in the second position.

5. The racking system of claim 2, wherein the lower swing arm portion is pivotally connected to the back legs, and the upper swing arm portion is pivotally connected to the solar panel array support.

6. The racking system of claim 2, wherein the at least one swing arm handle is arranged across the back legs.

7. The racking system of claim 2, wherein the at least one swing arm handle includes a short swing arm handle and a long swing arm handle.

8. The racking system of claim 7, wherein the multiple positions include a first position and a second position, and wherein the long swing arm handle abuts the back legs in the first position, and the long swing arm handle abuts the upper swing arm portion in the second position.

9. The racking system of claim 2, wherein locking means secure the solar panel array support in each of the multiple positions.

10. The racking system of claim 2, wherein the front legs are shorter than the rear legs.

\* \* \* \* \*